United States Patent
Mattan

[11] Patent Number: 5,876,873
[45] Date of Patent: Mar. 2, 1999

[54] SEALED LEAD-ACID CELLS AND BATTERIES HAVING INTERNAL AND EXTERNAL RESTRAINT FOR ACCOMMODATING PLATE GROWTH

[75] Inventor: Edward M. Mattan, St. Charles, Ill.

[73] Assignee: GNB Technologies, Inc., Lombard, Ill.

[21] Appl. No.: 786,530

[22] Filed: Jan. 21, 1997

[51] Int. Cl.[6] .................................................. H01M 2/02
[52] U.S. Cl. ........................... 429/181; 429/186; 429/225
[58] Field of Search .................................. 429/175, 176, 429/177, 181, 225, 228, 144, 185, 65, 186, 57, 216, 226

[56] References Cited

U.S. PATENT DOCUMENTS

| | | | |
|---|---|---|---|
| 2,257,489 | 9/1941 | Wells | 136/79 |
| 2,261,597 | 11/1941 | Sutherland | 136/81 |
| 2,470,163 | 5/1949 | Gray | 136/79 |
| 2,774,805 | 12/1956 | Harrison et al. | 136/79 |
| 3,443,995 | 5/1969 | Halsall et al. | 136/79 |
| 3,996,065 | 12/1976 | Trippe et al. | 429/208 |
| 4,122,244 | 10/1978 | Kämmerer et al. | 429/186 |
| 4,221,850 | 9/1980 | Attinger et al. | 429/160 |
| 4,455,356 | 6/1984 | Barrett, Jr. | 429/66 |
| 4,467,021 | 8/1984 | Stocchiero | 429/175 |
| 4,898,795 | 2/1990 | Stocchiero | 429/66 |
| 4,939,047 | 7/1990 | Nagashima | 429/66 |

FOREIGN PATENT DOCUMENTS

2026761 2/1980 United Kingdom ............ H01M 2/06

*Primary Examiner*—Kathryn Gorgos
*Assistant Examiner*—Thomas H. Parsons
*Attorney, Agent, or Firm*—Leydig, Voit & Mayer, Ltd.

[57] ABSTRACT

Sealed lead-acid cells are disclosed which include an internal cell restraint contacting the interior surface of the cover and positioned between the positive plates and the cover, the internal cell restraint cooperates with an external cell restraint, such as a coated metal face plate, to direct positive plate growth which occurs in service away from the cover, the features disclosed allowing plastic-to-plastic terminal post-cover seals to be used and allow cells of capacities of up to 2,000 Ampere Hours or more to be provided.

31 Claims, 5 Drawing Sheets

SEALED LEAD-ACID CELLS AND BATTERIES HAVING INTERNAL AND EXTERNAL RESTRAINT FOR ACCOMMODATING PLATE GROWTH

FIELD OF THE INVENTION

The present invention relates to lead-acid cells and batteries, and more particularly to such cells and batteries capable of accommodating the positive grid growth which occurs in service while providing desirable performance.

BACKGROUND OF THE INVENTION

Sealed lead-acid cells and batteries, for many applications, have significant advantages in comparison to the use of conventional, flooded lead-acid cells and batteries. Such cells and batteries, sometimes termed "VRLA" cells and batteries (i.e., valve-regulated, lead-acid), utilize a safety valve (e.g., a Bunsen valve) to maintain the desired internal pressure for an efficient oxygen recombination cycle.

Some applications where such sealed cells and batteries are used are termed stationary battery applications. In such applications, such cells and batteries are maintained at a full state-of-charge and in a ready-to-use condition, typically by floating at a constant preset voltage. Stationary cells and battery applications include use for stand-by or operational power, including telecommunications, utilities, emergency lighting for commercial buildings, stand-by power for cable television systems, and uninterruptible power supplies.

Such uninterruptible power supplies concern, for example, systems which back-up computers and communication networks. Having a reliable uninterruptible power source accommodates the orderly shutdown of computers when there is a sudden interruption in the primary power source, typically during an electrical power outage. Such an uninterruptible power source will also accommodate short, or intermittent, losses in power. In the event of a power interruption, the uninterruptible power source is subject to a rapid, and sometimes deep, discharge.

Another potential application for sealed lead-acid cells and batteries is a variety of motive power applications in which an array of cells or batteries provides the motive power for vehicles ranging from Class 1 to Class 3 trucks, various automated guided vehicles, mining vehicles and also railroad locomotives. The performance requirements for motive-powered vehicles are quite different from the performance requirements for stationary battery power sources. In stationary applications, the depth of discharge in service is relatively shallow, and the number of discharges is small, as most batteries are in float service. In direct contrast, motive power applications require relatively deep depths of discharge to be achieved on a continuous cycling basis over a period of time. Indeed, a common requirement for Class 1–3 trucks is that, in an 8-hour shift, the cell or battery assembly must be capable of delivering an 80% depth of discharge and that performance is required for about 300 cycles per year with a useful service life under those conditions of 4 or 5 years.

A common problem encountered by such VRLA cells and batteries is the integrity of the seals over time as a result of grid growth which occurs in service. As has been especially common at the positive terminal, grid growth occurs as a battery grid corrodes over time, hence causing the battery terminal to move outwardly relative to the battery cover. This relative rise causes stress on both the required terminal-cover seal, as well as the requisite container-cover seal. As the container and cover are commonly made of plastic, each was known to fail in various ways, such as by fracturing, cracking at welds, and so forth. Failures such as these have resulted in the leakage of electrolyte from the cells and batteries and has also resulted in failure of the cell to operate properly. This well-known problem is particularly acute in sealed lead-acid cells and batteries because relatively high internal temperatures in service can be reached. Such relatively high temperatures lead to an increase in the rate of grid corrosion which can result in significant grid growth. Further, what can occur in service is deflection of the positive terminal post which can result in a possible loss of connection to the adjacent stationary terminal post. Indeed, such grid growth can result in the buckling of a positive plate resulting in loss of capacity as well as possible shorting and the like.

This problem is not only well-known, but also has commanded substantial attention. A wide variety of attempted solutions have been proposed. Various solutions are thus described in U.K. Patent 2,026,761A, U.S. Pat. Nos. 4,455,356 to Barrette, Jr.; 4,467,021 and 4,898,795 to Stocchiero.

There are several other issues and concerns which complicate the design of sealed lead-acid cells. More particularly, to provide a satisfactory terminal-cover seal for sealed lead-acid cells, it has generally been found necessary to utilize a lead or lead alloy bushing which is embedded in the cover that is, then, in turn, welded or fused to the terminal. This design approach can be relatively expensive, and amenability to automatic production, while achieving satisfactory quality control, can be difficult.

Still further, design considerations need to address problems such as avoiding, in service, plate edge shorting, uneven separator saturation levels and electrolyte stratification. Insuring that the cell possesses satisfactory shock and vibration resistance must also be taken into account in designing sealed lead-acid cells.

These design issues and considerations often can be exacerbated as the size of the individual cells required for the particular application is increased. Indeed, relatively large capacity cells raise additional design issues, such as insuring that satisfactorily reliable electrical connections between the plates and the respective terminals are retained. Yet another design issue concerns satisfactory alignment of the cell element in the jar or container during assembly.

These design issues are of substantial concern because a variety of applications for sealed lead-acid cells, such as, for example, stand-by power in telecommunications, make the application of cells having extremely high capacities desirable. Indeed, in this connection, it becomes desirable to provide individual sealed lead-acid cells having capacity of 2,000 Ampere Hours and indeed up to 3,000 Ampere Hours capacity, or even greater. Considerable difficulty in achieving commercial production with acceptable quality control is encountered when designing cells of such relatively large capacities.

Indeed, despite the substantial amount of prior work in this field, there still exists a need for a design for sealed lead-acid cells which effectively satisfies the many issues and concerns as discussed herein.

Accordingly, it is a primary object of the present invention to provide a sealed, VRLA lead-acid cell that at least minimizes, if not eliminates, the problems associated with positive plate growth during service. A related and more specific object provides such a cell which may be used to essentially prevent the growth of the positive plate in a direction toward the cover and terminal during service.

Another object is to provide such a sealed cell having a design particularly well suited for cells having relatively high capacities.

A still further object is to provide a cell which eliminates the need for a bushing in the cover and is more amenable to large scale and/or automated production.

Yet another object is to provide a cell in which precise positioning of the cover and terminal during assembly is unnecessary.

A further object is to provide a sealed cell amenable for large sized cells which provides improved performance, minimizing the problems due to shock and vibration resistance and plate shorting.

A still further object is to provide such a cell that minimizes the problems due to uneven separator saturation levels and eliminates electrolyte stratification issues.

Other objects and advantages of the present invention will be apparent as the following description proceeds, taken with the accompanying drawings. The present invention will be described in conjunction with certain preferred embodiments; however, it should be appreciated that it is not intended to limit the invention to the embodiments disclosed. Rather, it is intended to cover all alternative and equivalents to these embodiments and to the claimed invention. For example, while the present invention will be described in conjunction with sealed lead-acid cells and batteries, it should be appreciated that the present invention is equally applicable to use with any cell or battery wherein plate growth during service results and must be accommodated.

SUMMARY OF THE INVENTION

In general, the present invention is predicated on a sealed lead-acid cell design which, in essence, directs the positive grid growth that occurs in service away from the terminal-cover and container-cover seals. More particularly, by providing internal and external cell restraints, positive grid growth which occurs in service is directed toward the bottom of the container; and the positive plates are spaced sufficiently away from the bottom of the container so that grid growth in this direction is accommodated during the service life of the sealed lead-acid cell.

Other preferred aspects of the present invention include a cell design highly amenable to reliable production and assembly. Indeed, in accordance with the preferred embodiments of this invention, alignment of the cell element when inserted into the container is facilitated. Other preferred design features allow both heat sealing of the cover to the terminals and to the container, as well as minimizing the requisite accuracy of alignment of the terminal and cover for the heat seal step.

Still other features of the present invention provide a sealed cell design amenable to the reliable production of cells of relatively large capacity, cell sizes up to 2,000 to 3,000 Ampere Hours and even larger can thus be provided. Such cells are likewise configured to provide a desired configuration in use.

DETAILED DESCRIPTION OF THE INVENTION

Figure 1:
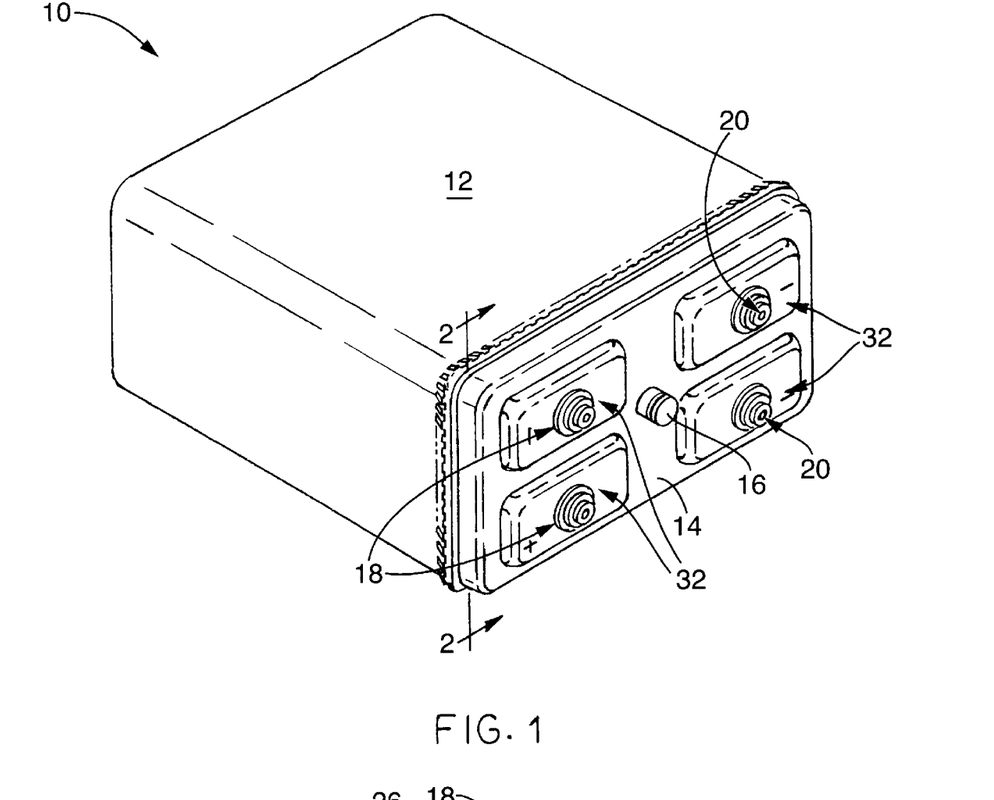
FIG. 1 is an isometric view of a preferred embodiment of a sealed lead-acid cell according to the present invention.

FIG. 1 shows a sealed, VRLA cell, shown generally 10 having a container 12 (often termed a "jar") and a cover 14. Any material useful for lead-acid cells and batteries can be used for the container and cover, and the many useful materials are known. Typically, conventionally used plastics materials include ethylene-propylene copolymers. Polycarbonates or other plastics materials suitable for withstanding higher thermal conditions are also known. Such containers and covers can be made by any technique desired, such as, for example, injection molding. For the containers, and particularly for containers of relatively large size, it is desirable to eliminate, or at least essentially minimize any draft from the bottom to the top of the container so that the internal container size does not vary significantly from the top to the bottom, thereby allowing more uniform compression of the cell element, as will be discussed hereinafter.

Valve 16, a conventional safety valve, maintains the internal pressure to the level desired to provide efficient oxygen recombination, as is known. While the use of a safety valve and maintaining an internal cell pressure in the range of about 5 to 10 psig are often used, these are merely illustrative of useful pressures. The particular operating parameters are not within the scope of the present invention, and any parameters and/or valves considered appropriate for the particular application may be used.

The cell 10 likewise includes positive terminals 18 and negative terminals 20. Any of the many known terminal designs may be employed. Indeed, the particular terminal design may be dictated by the particular application.

In accordance with one preferred aspect of the present invention, cells of a relatively large capacity preferably include two or more positive and negative terminals. More particularly, to provide a cell having a nominal capacity of 2,000 Ampere Hours, it has been found preferable to utilize plates having dual lugs and terminals. Thus, in view of the relatively large plates which need to be used (e.g., a positive plate of a size rated at providing in the cell about 170

Ampere Hours and having a length and width of about 16 inches) such dual lugs and terminals provide both efficient current collection, but also enhance the reliability of the electrical connections. Stated differently, the use of these dual lugs and terminals lessens the probability that large current drains will result in melting or otherwise impairing the structural integrity of the straps and lugs used. In the more preferred aspects of the present invention, when the cells are even larger, i.e., up to about 3,000 Ampere Hours or more, it has been found useful to utilize plates having at least two lugs and three positive and negative terminals to carry the current level.

In assembling the container 12 and the cover 14, it is necessary to achieve cover-container and terminal-cover seals that are of sufficient strength and reliability to provide satisfactory performance during service. This can be effected using many known techniques, such as heat sealing and the like. If desired, the terminal-cover sealing can involve molding into the cover a metallic bushing (e.g., a lead or lead alloy material) which is then welded or fused with the terminal material, as is known.

Figure 2:
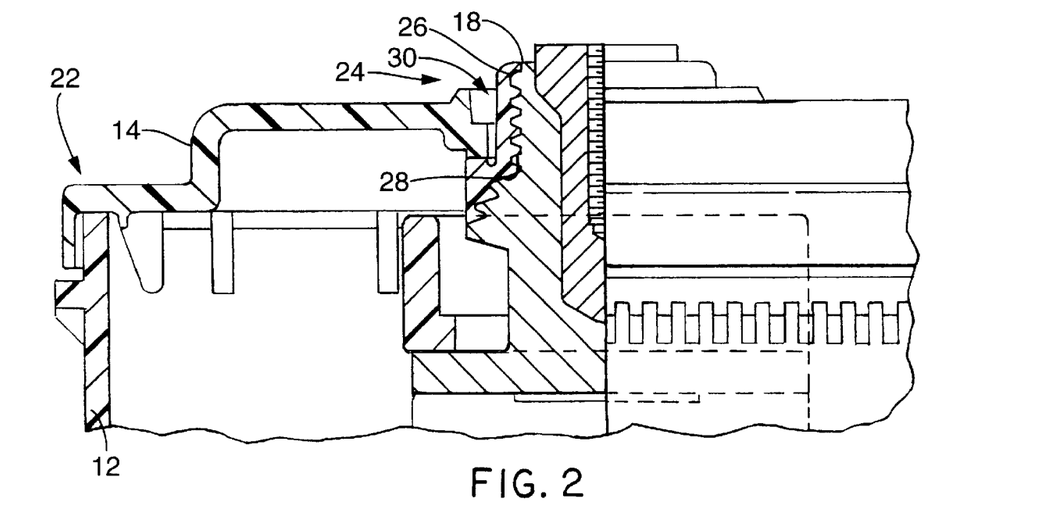
FIG. 2 is a partial cross-sectional view showing the interior of the cell in FIG. 1 and illustrating a preferred embodiment of the terminal-cover seal.

Thus, as shown in FIG. 2, container 12 is heat sealed to cover 14 as indicated generally at 22 and the cover-terminal seal is effected, as shown generally at 24.

However, in accordance with the preferred embodiment of the present invention, the positive and negative terminal construction includes a compatible plastic material (e.g., ethylene propylene copolymer where a similar material is used for the cover 14) which is molded about the exterior of the terminal so that the terminal-cover seals can be effected by heat sealing or the like. To this end, and as is shown in FIG. 2, the terminal (the positive terminal 18 being shown for illustrative purposes) has a plastic exterior 26 molded about the periphery of the electrically conductive terminal, positive terminal 18 being shown. It will generally be useful to provide the exterior of the terminal with a series of irregular rings or the like as shown at 28 so as to effect both a desirable bond between the plastic exterior 26 and the positive terminal 18 as well as to provide a relatively long, tortuous path for electrolyte or the like to travel before escaping the interior of the cell. The plastic member 26 can be molded about the respective terminals at any point desired in the assembly process. It may be more effective from the standpoint of economy to mold the plastic member 26 about the terminal prior to assembly and during the making of the terminals which are typically separately manufactured.

In comparison to utilizing a metal bushing embedded in the cover, accomplishing the terminal-cover seal by heat sealing should provide both economy and a more desirable assembly, enhancing reliability in performance. However, creating a plastic-plastic terminal-cover seal also elevates the need for a satisfactory structure to prevent positive grid growth from weakening or rupturing the plastic-plastic, heat-sealed interface.

In accordance with yet another aspect of the preferred embodiment of the present invention, further process simplification can be effected by designing the cover and terminal-plastic members such that an opening purposely remains. More particularly, to facilitate alignment for a heat sealing operation, the cover and plastic-terminal members are configured so that the resulting heat-sealed cell will have an annular opening area visible to anyone examining the assembled cell. Thus, as is shown in FIG. 2, opening 30 remains after completion of the heat sealing. The open area can then be filled, as by a hot melt adhesive. By coloring the hot melt adhesive the same color as the cover around the location of the hot melt adhesive, the resulting, filled-in cover will appear to be uniform, thereby providing desirable aesthetic effects. As one illustrative example, the terminal regions shown generally at 32 (best shown in FIG. 1) may be gray while the respective positive terminal 18 is red and the negative terminal 20 is black. In this fashion, precise alignment of the cover upon the container in assembly becomes unnecessary. The resulting assembled cell will cosmetically eliminate any irregularities due to slight misalignments since the overall color remains the same regardless.

In accordance with another aspect of the present invention, an internal cell restraint is provided which cooperates in directing the positive grid growth away from the cover, protecting the terminal-cover and the container-cover seals. As will hereinafter be discussed in greater detail, the internal cell restraint cooperates with an external cell restraint that together direct the positive grid growth which occurs during service toward the bottom of the cell and away from the respective seals.

Figure 3:
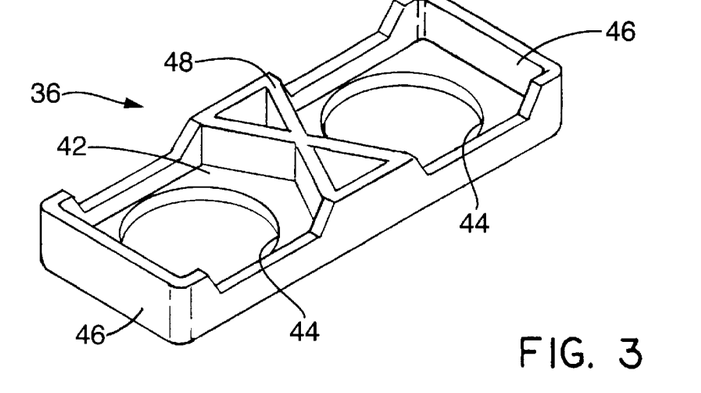
FIG. 3 is an isometric view of a preferred embodiment of an internal cell restraint used in the present invention to assist in directing the positive grid growth in service in a direction away from the cell cover and terminal.
Figure 4:
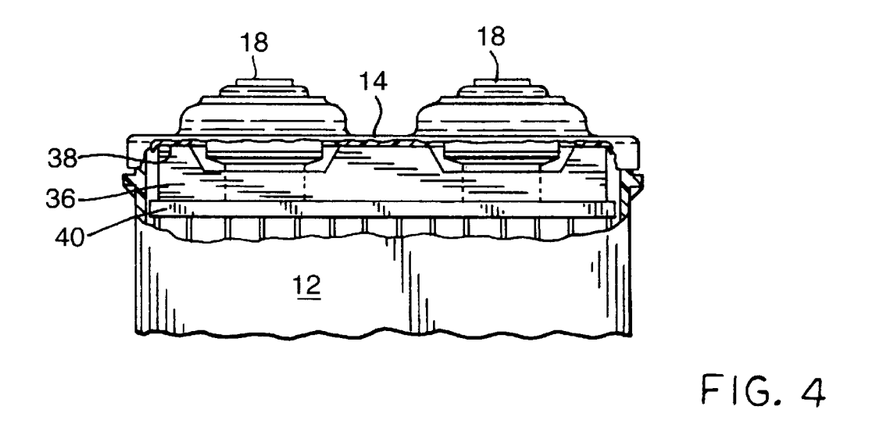
FIG. 4 is a partial cross-sectional view taken generally along line 2—2 of FIG. 1, and showing the internal cell restraint in position in the cell.

To this end, an internal cell restraint 36 (FIG. 3) is provided which contacts the inner surface 38 of cover 14 while also resting on strap 40, as is shown in FIG. 4. The internal cell restraint 36 should be sufficiently rigid so as to adequately resist the forces resulting from positive grid growth in service. The internal cell restraint 36 in the illustrative embodiment (FIG. 3) comprises a unitary rigid plastic member having a base 42, terminal openings 44 about the terminal post of each positive terminal 18 which extends through the openings (as best seen in FIG. 4), upstanding end walls 46 and central support member 48, the end walls 46 and the central support member 48 being dimensioned to span the distance from the top of the plates and/or strap to the inner surface 38 of the cover 14.

The particular configuration of the internal cell restraint 36, or indeed the fashion in which restraint against positive grid growth movement toward the cover 14, can be varied as desired so long as the functional objectives set forth herein are achieved. The illustrative internal cell restraint 36 should desirably distribute the forces resulting from positive grid growth while functioning together with the external cell restraint to insure that the reliability of the terminal-cover and the terminal-container seals are satisfactorily protected.

The materials and construction of the internal cell restraint can be varied as desired. Exemplary useful plastics for the restraint include filled polypropylene materials. Any plastic having adequate rigidity for this application could be used including polyvinylchloride, acrylonitrile-butadiene-styrene polymers, styrene-acrylonitrile polymers and polycarbonates.

Also, as has been indicated, any alternative design may be utilized for the internal cell restraint so long as the function objectives of this invention are satisfied. In general, the cell design must focus on insuring that positive grid growth is directed away from the cover. Thus, the internal cell restraint could be incorporated into the cover, i.e., molding the cover so that the inner surface contacts the positive strap and/or plates. Alternatively, a separate rigid part could be heat sealed to the underside of the cover, providing a spacer for positive strap/plate restraint and adding rigidity to the cover. Indeed, if desired, the internal cell restraint could be built into the positive strap(s), shaping the strap such that it contacts the underside of the cover.

Figure 5:
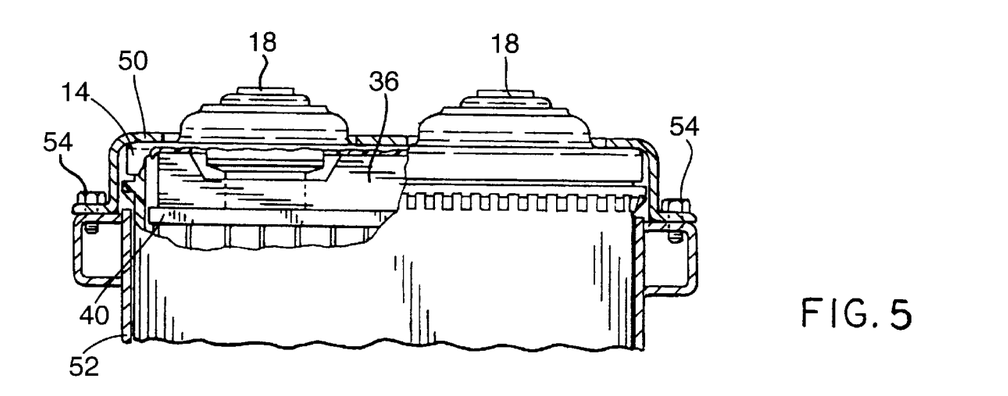
FIG. 5 is a partial cross-sectional view showing the external cell restraint which cooperates with the internal cell restrain to essentially eliminate growth of the positive plate during service in the direction toward the cover-terminal seal.

The present invention utilizes an external cell restraint which cooperates with the internal cell restraint so as to direct the positive grid growth toward the bottom of the cell container and away from the cover. To this end, and as can be seen from FIGS. 5 and 6, external cell restraint 50 comprises a face plate that fits over the cover 14, allowing the safety valve 16, the positive terminals 18 and the negative terminals 20 to project through the complementally sized apertures for those components. External cell restraint 50 is then attached to an external support, i.e., the tray, rack or cabinet, or the like, used for the particular application. To this end, and as is shown in FIG. 5, external cell restraint 50 is attached to cell support 52 with bolts 54.

Figure 6:
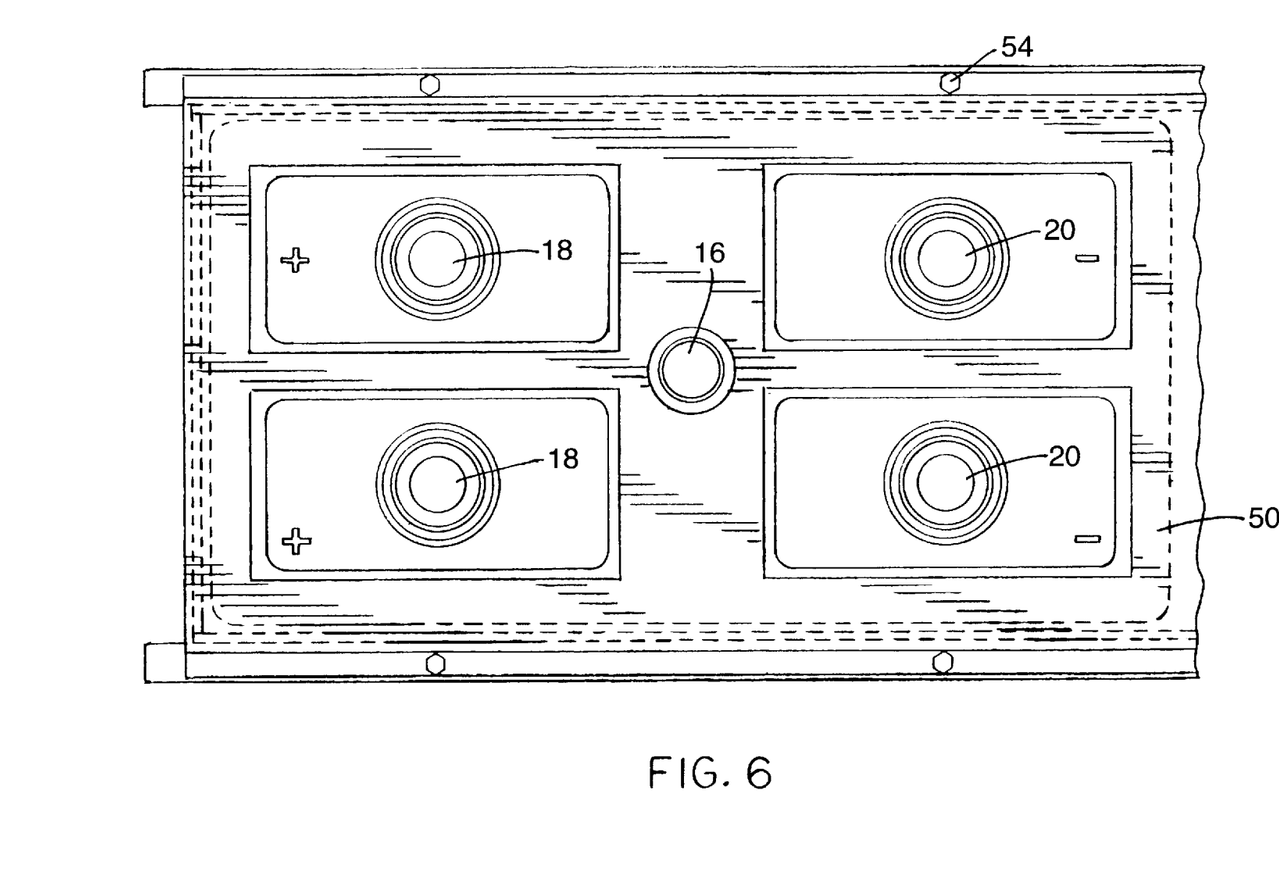
FIG. 6 is a front elevation view showing the external cell restraint in position during service.

As was the case with the internal cell restraint, the particular configuration of the external cell restraint 50 can be varied as desired so long as the functional criteria are satisfied. For cells having extremely large capacities as has been discussed herein, external restraint 50 can be made of steel or the like, coated to provide electrical insulation. Any plastic or other metal with an insulating coating can be used so long as adequate strength is provided.

The use of the cell restraint system described herein provides the ability to utilize terminal-cover seals effected through a plastic-plastic interface. The heat sealing technique involved facilitates assembly, but can be more susceptible to damage than when such seal is effected using a metallic bushing in the cover. The cell restraint system described herein thus offers the ability to facilitate assembly of the cells while still providing ample protection against damage during service.

Inasmuch as the cell restraint system of the present invention directs positive grid growth away from the cell cover, the positive plates should be sized so that such plates can grow toward the bottom of the cell container 14. The extent of grid growth can be satisfactorily estimated, based on the size of the plates and the like. For an extremely large capacity cell (e.g., 2,000 Ampere Hours or more), it should be satisfactory to maintain a distance from the bottom of the positive plates to the internal surface of the bottom of the container at about ½ to ¾ inch or so.

Figure 7:
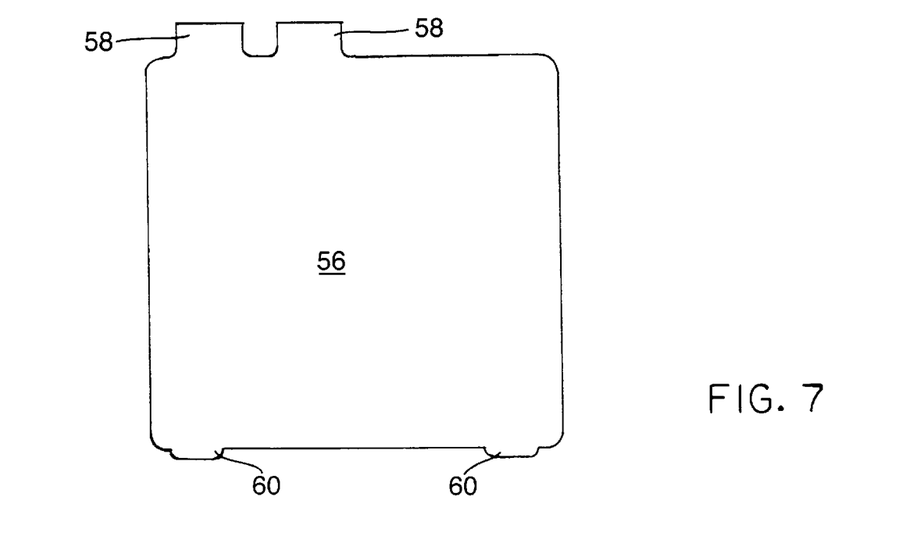
FIG. 7 is a schematic view of a preferred embodiment of a negative plate used in the preferred embodiment of the present invention.

Pursuant to yet another aspect of the preferred embodiment of this invention, the cell element comprises negative plates that contact the bottom of the cell container and the cell element is sized to tightly fit into the cell so that the positive plates are held in place via frictional force, which restricts, but does not prevent, growth of the positive plates during service toward the bottom of the cell container. To this end, and as is seen in FIG. 7, a negative plate 56 with dual lugs 58 has a plurality of feet 60. The negative plates 56 are sized so that the feet 60 will rest upon the bottom of the cell container, thereby facilitating proper alignment of the cell element within the cell container during assembly, while minimizing the amount of material needed for the negative plates.

Stated differently, while the negative plates could be sized so that the bottom surface thereof would contact the container bottom, the extra material is unnecessary, costly, and would not add to the electrical performance of the cell. While utilizing negative plates having two feet are satisfactory, three or more feet could be used if desired for whatever reason. The use of this configuration is preferred because this avoids problems when the positive plates, in effect, simply hang from the strap (these problems include lower resistance to vibration, possible problems with the lug to strap bond and corrosion of that bond due to higher stress levels due to the plate weight and/or movement).

Another aspect of the preferred embodiment of the present invention lies in the geometry of the plates utilized.

Thus, many conventionally used sealed cells utilize plates having relatively tall, narrow plates; and the height dimension increases (generally while the plate width stays the same) to provide larger plates for increased electrical capacity (together, of course, with adding more plates). One preferred aspect of this invention is to utilize plates that have relatively low height-to-width aspect ratios, i.e., less than about 2:1, and, more preferably, approaching 1:1. In this fashion, individual plates can contribute more to achieving cells with larger electrical capacities than can be effectively achieved, simply by increasing the plate height. This is particularly important when cells having capacities of 2,000 Ampere Hours or more are desired. Even further, the cell depth required to achieve such large capacity cells is lessened, creating more desirable performance in service, particularly when the cells are oriented in service so that the plates are in a pancake orientation as will be described hereinafter.

The sealed cells of the present invention, just like any VRLA cells, can be used in any orientation, as is known. As is thus appreciated with sealed cells, since the necessary electrolyte is absorbed within the plates and separators, essentially no free electrolyte is contained in the cells so that these cells do not need to be used in an upright position, as would be the case with conventional flooded electrolyte lead-acid batteries.

Plate edge shorting, uneven separator saturation levels, electrolyte stratification, and shock and vibration resistance are all issues of concern in the design of sealed lead-acid batteries. These concerns become exacerbated with large capacity cells.

In addition, and as is known, enhanced electrical performance requires that contact be maintained between the absorbent separators containing electrolyte and the porous positive and negative plates. It is accordingly known to provide compression by force fitting the cell element into the container, each being sized so that the absorbent separators are compressed by at least about 15% of their uncompressed thickness.

Figure 8:
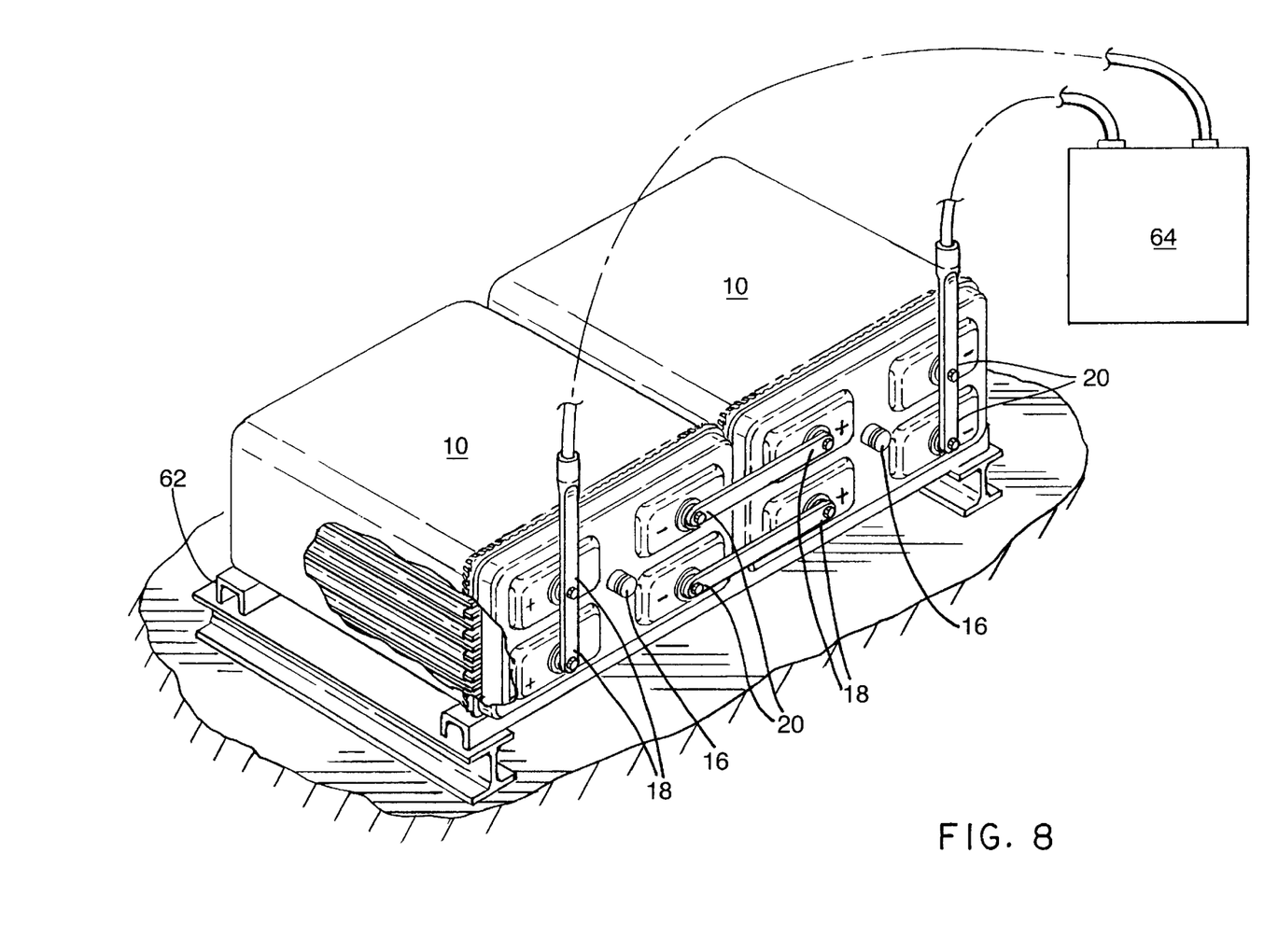
FIG. 8 is an isometric view showing two cells in accordance with the present invention positioned for service in a side-by-side relationship in which the cell plates are oriented horizontally (the external cell restraint and the cell rack not being shown for simplicity)

Accordingly, pursuant to yet another aspect of the preferred embodiment of this invention, the sealed cells are oriented in service so that the plates in the cells are in a pancake configuration, i.e., the plates are parallel to the ground or support surface, as contrasted with an upright orientation. To this end, and as is shown in FIG. 8, the two cells 10 shown are positioned in service on their sides, resting on support 62 and are then connected to the application system or the like requiring the uninterruptible power source (e.g., telecommunications), as designated by block 64. In this fashion, of particular importance with cells of large capacities, separator saturation and stratification issues are minimized.

Even further, the pancake orientation enhances electrical performance during use. Thus, the weight of the positive and negative plates, stacked one upon another in pancake fashion, spaced apart only by the absorbent separators, are sufficiently heavy in relation to the weight of the separator that appropriate compression is retained during service.

Figure 9:
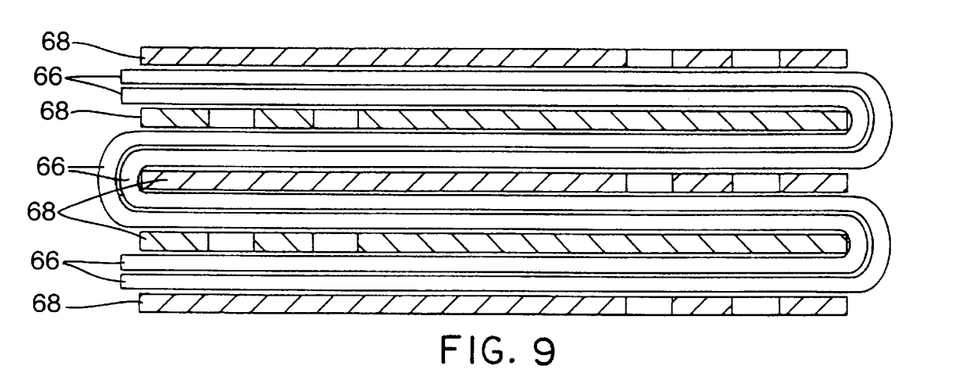
FIG. 9 is a schematic view showing a preferred embodiment of a separator wrap about the respective positive and negative plates of the cell element.

Yet another aspect of the preferred embodiment of the present invention utilizes a one-piece absorbent separator wound between the pancake-oriented plates in serpentine fashion. To this end, and as is shown in FIG. 9, absorbent separator 66 is wound between the respective positive and negative plates as is shown in FIG. 9, the plates being collectively indicated at 68. In the illustrative embodiment shown, two, one-piece separators are used rather than one thicker separator. Two thinner separators, together providing the desired separator thickness may provide ease in assembly due to handleability and the like.

Figure 10:
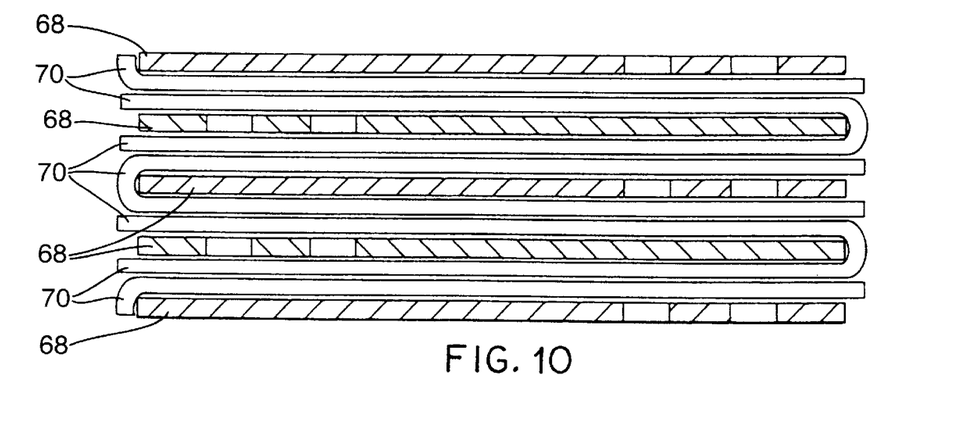
FIG. 10 is a further embodiment of another desired separator wrap for the cell element.

While preferred, due to the one-piece configuration, a desirable alternative embodiment includes a double, or opposing, U-wrap in which each plate is wrapped with a separator having a thickness which, together with the thickness of the separator wrapping the adjacent plate, provides the desired thickness. For ease of assembly, for example, each plate is wrapped with an absorbent separator having approximately half the thickness desired of the composite separator. Thus, as is shown in FIG. 10, the respective positive and negative plates, generally indicated by 68, are each wrapped with a separator 70.

Thus, as has been seen, and as may be appreciated, the present invention provides a reliable design for sealed lead-acid batteries, facilitating both assembly as well as insuring desirable performance in service.

I claim:

1. A sealed lead-acid cell assembly in which the lead-acid cell is subject to positive grid growth during service comprising a cell support structure capable of housing at least one sealed lead-acid cell, a cell container sized to accommodate a cell element, a cell element positioned in said cell container and comprising a plurality of positive and negative plates and an absorbent separator positioned between adjacent plates, a cover sealed to said container and having an exterior and an interior surface, at least one positive terminal sealed to said cover and at least one negative terminal sealed to said cover, each of said positive and negative plates having at least one lug, a positive strap electrically connecting the lugs of the respective positive plates together, a negative strap electrically connecting the lugs of said negative plates together, the positive strap being electrically connected to the positive terminal and the negative strap being connected to the negative terminal, an internal restraint contacting the interior surface of the cover and positioned between said positive plates and said cover, an external restraint connected to said cell support structure and in contact with the exterior surface of the cover and said external and internal restraints directing the positive grid growth in service in a direction away from the internal surface of said cover.

2. The cell assembly of claim 1 wherein the cover is plastic, the positive and negative terminals comprise an electrically conductive metal material having plastic surrounding said metal material and said terminals having been heat sealed to provide a terminal-cover seal.

3. The cell assembly of claim 2 wherein said heat-sealed cover has an open area about the terminal and a hot melt adhesive being contained in said open area.

4. The cell assembly of claim 3 wherein said hot melt adhesive and at least the portion of said cover surrounding said hot melt adhesive each are colored the same.

5. The cell assembly of claim 4 wherein the positive terminal is colored red, the negative terminal is colored black, and said cover is gray.

6. The cell assembly of claim 1 wherein said cell support structure is a tray.

7. The cell assembly of claim 1 wherein said cell support structure is a rack.

8. The cell assembly of claim 1 wherein said cell support structure is a cabinet.

9. The cell assembly of claim 1 wherein the container has a bottom having an internal bottom surface, said negative plates have at least two spaced feet contacting said internal bottom surface, said negative plates being otherwise spaced from said bottom interior surface, and said positive plates being dimensioned such that said positive plates are spaced from the internal bottom surface of said container a distance sufficient to allow positive plate growth in service to occur and, when said cell is positioned in an upright manner, said cell element is sufficiently compressed in said container such that the positive plates are held in alignment with frictional force.

10. The cell of claim 1 in which each of said positive and negative plates has at least two lugs and said cell has an electrical capacity of at least 2,000 Ampere Hours.

11. The cell assembly of claim 10 wherein each positive and negative plate has at least two lugs and said cell has an electrical capacity of at least about 3,000 Ampere Hours.

12. The cell assembly of claim 1 wherein said positive and negative plates have a height to width ratio of less than 2:1.

13. The cell assembly of claim 1 wherein said separator comprises at least one layer of a single piece of material wrapped about said positive and negative plates in a serpentine fashion.

14. The cell assembly of claim 1 wherein said separator is positioned between and about said positive and negative plates in a double U-wrap configuration.

15. The cell assembly of claim 1 wherein said exterior plate restraint comprises a metallic face plate positioned on the exterior surface of the cover and attached to said cell support structure.

16. The cell assembly of claim 1 wherein said internal plate restraint comprises a plastic insert resting on said positive plate strap when said cell is in an upright position and having an opening allowing electrical connection between said positive strap and positive terminal to be made.

17. A sealed lead-acid cell in which the lead-acid cell is subject to positive grid growth during service comprising a cell support structure capable of housing at least one sealed lead-acid cell, a cell container sized to accommodate a cell element, a cell element positioned in said cell container and comprising a plurality of positive and negative plates and an absorbent separator positioned between adjacent plates, a cover sealed to said container and having an exterior and an interior surface, at least one positive terminal sealed to said cover and at least one negative terminal sealed to said cover, each of said positive and negative plates having at least one lug, a positive strap electrically connecting the lugs of the respective positive plates together, a negative strap electrically connecting the lugs of said negative plates together, the positive strap being electrically connected to the positive terminal and the negative strap being connected to the negative terminal, and an internal restraint contacting the interior surface of the cover and positioned between said positive plates and said cover, and said internal restraint, cooperating in service, with an external cell restraint to direct movement caused by positive grid growth in service in a direction away from the internal surface of said cover.

18. The sealed lead-acid cell of claim 17, wherein the cover is plastic, the positive and negative terminals comprise an electrically conductive metal material having plastic surrounding said metal material and said terminals having been heat sealed to provide a terminal-cover seal.

19. The sealed lead-acid cell of claim 18 wherein said heat-sealed cover has an open area about the terminal and a hot melt adhesive being contained in said open area.

20. The sealed lead-acid cell of claim 19 wherein said hot melt adhesive and at least the portion of said cover surrounding said hot melt adhesive each are colored the same.

21. The sealed lead-acid cell of claim 20 wherein the positive terminal is colored red, the negative terminal is colored black, and said cover is gray.

22. The sealed lead-acid cell of claim 17, wherein the container has a bottom having an internal bottom surface, said negative plates have at least two spaced feet contacting said internal bottom surface, said negative plates being otherwise spaced from said bottom interior surface, and said positive plates being dimensioned such that said positive plates are spaced from the internal bottom surface of said container a distance sufficient to allow positive plate growth in service to occur and, when said cell is positioned in an upright manner, said cell element is sufficiently compressed in said container such that the positive plates are held in alignment with frictional force.

23. The sealed lead-acid cell of claim 17, in which each of said positive and negative plates has at least two lugs and said cell has an electrical capacity of at least 2,000 Ampere Hours.

24. The sealed lead-acid cell of claim 23 wherein each positive and negative plate has at least two lugs and said cell has an electrical capacity of at least about 3,000 Ampere Hours.

25. The sealed lead-acid cell of claim 17 wherein said separator comprises a single piece of material wrapped about said positive and negative plates in a serpentine fashion.

26. The sealed lead-acid cell of claim 17 wherein said separator is positioned between and about said positive and negative plates in a double U-wrap configuration.

27. The sealed lead-acid cell of claim 17 wherein said internal plate restraint comprises a plastic insert resting on said positive plate strap when said cell is in an upright position and having an opening allowing electrical connection between said positive strap and positive terminal to be made.

28. A stationary uninterruptible power source system comprising an application system requiring an uninterruptible power source of particular electrical capacity, said application system being located in an area having a floor, a sealed lead-acid cell assembly having said particular electrical capacity and positioned adjacent said application system and electrically connected thereto, said cell assembly comprising cell support structure resting on the floor, a plurality of sealed cells providing the particular electrical capacity positioned on said cell support structure, each of said cells comprising a cell container sized to accommodate a cell element, a cell element positioned in said cell container and comprising a plurality of positive and negative plates and an absorbent separator positioned between adjacent plates, a cover sealed to said container and having an exterior and an interior surface, at least one positive terminal sealed to said cover and at least one negative terminal sealed to said cover each of said positive and negative plates having at least one lug, a positive strap electrically connecting the lugs of the respective positive plates together, a negative strap electrically connecting the lugs of said negative plates together, the positive strap being electrically connected to the positive terminal and the negative strap being connected to the negative terminal, an internal restraint contacting the interior surface of the cover and positioned between said positive plates and said cover, an external restraint connected to said cell support structure and in contact with the exterior surface of the cover and said external and internal restraints directing movement caused by positive grid growth in service in a direction away from the internal surface of said cover, at least some of said cells being in a pancake orientation.

29. The stationary uninterruptible power source system of claim 28 wherein all of said cells are in a pancake orientation.

30. The stationary uninterruptible power source system of claim 29 wherein said application system is a telecommunications system.

31. The stationary uninterruptible power source system of claim 30 wherein each of said cells has an electrical capacity of at least about 2,000 Ampere Hours.

* * * * *